(12) United States Patent
Duesterberg et al.

(10) Patent No.: US 9,453,967 B2
(45) Date of Patent: Sep. 27, 2016

(54) HIGH POWER MISALIGNMENT-TOLERANT FIBER ASSEMBLY

(71) Applicant: Lumentum Operations LLC, Milpitas, CA (US)

(72) Inventors: Richard L. Duesterberg, Sunnyvale, CA (US); Yan Xiao, Milpitas, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 14/517,165

(22) Filed: Oct. 17, 2014

(65) Prior Publication Data

US 2016/0109656 A1     Apr. 21, 2016

(51) Int. Cl.
G02B 6/26     (2006.01)
G02B 6/38     (2006.01)

(52) U.S. Cl.
CPC ............. G02B 6/262 (2013.01); G02B 6/3826 (2013.01)

(58) Field of Classification Search
CPC ............................ G02B 6/262; G02B 6/3826
See application file for complete search history.

(56) References Cited

U.S. PATENT DOCUMENTS

| | | | | |
|---|---|---|---|---|
| 3,900,245 | A * | 8/1975 | Dyott | G02B 6/262 385/125 |
| 3,995,935 | A * | 12/1976 | McCartney | G02B 6/264 385/15 |
| 4,795,228 | A * | 1/1989 | Schneider | G02B 6/4206 385/126 |
| 4,868,361 | A * | 9/1989 | Chande | G02B 6/32 219/121.62 |
| 4,877,300 | A * | 10/1989 | Newhouse | G02B 6/4202 385/43 |
| 5,018,823 | A * | 5/1991 | Himmelwright | G02B 6/3813 385/70 |
| 5,044,723 | A * | 9/1991 | MacDonald | G01F 23/2925 356/128 |
| 5,054,877 | A * | 10/1991 | Ortiz, Jr. | G02B 6/2817 385/33 |
| 5,179,610 | A * | 1/1993 | Milburn | G02B 6/3813 385/147 |
| 5,185,836 | A * | 2/1993 | Baker | G02B 6/262 385/33 |
| 5,210,815 | A * | 5/1993 | Alexander | G02B 6/262 385/138 |
| 5,291,570 | A * | 3/1994 | Filgas | G02B 6/3813 385/78 |
| 5,490,227 | A * | 2/1996 | Tanabe | G02B 6/02 385/28 |
| 5,738,677 | A * | 4/1998 | Colvard | A61F 9/00802 128/898 |
| 6,330,382 | B1 * | 12/2001 | Harshbarger | G02B 6/14 385/123 |
| 6,408,126 | B1 * | 6/2002 | Hoekstra | G02B 6/125 385/130 |
| 6,428,217 | B1 * | 8/2002 | Giltner | G02B 6/2551 372/6 |

(Continued)

*Primary Examiner* — Peter Radkowski
(74) *Attorney, Agent, or Firm* — Harrity & Harrity, LLP

(57) ABSTRACT

Fiber burning and/or overheating of the fiber feedthrough in high-power laser modules, which may cause catastrophic and/or collateral damage, may be addressed by providing an optical fiber assembly designed to withstand overheating due to errant high power laser light that is directed toward the input core of a fiber but may be at least partially misaligned. The optical fiber may be secured within a mount having a passageway such that the end face of the optical fiber extends past an opening of the passageway to a focal plane of the incident light. The end of the optical fiber may include a section that has a reduced or absent cladding layer (e.g., etched to form a tapered cladding region) so as to reduce the amount of light captured by the cladding and/or to leak the light out quickly.

26 Claims, 9 Drawing Sheets

(56) References Cited

U.S. PATENT DOCUMENTS

| | | | |
|---|---|---|---|
| 6,434,302 B1* | 8/2002 | Fidric | G02B 6/2856 385/43 |
| 6,445,858 B1* | 9/2002 | Musk | G02B 6/4226 385/52 |
| 6,904,198 B2* | 6/2005 | Dykaar | G02B 6/02085 385/124 |
| 6,905,627 B2 | 6/2005 | Wei et al. | 216/97 |
| 6,948,862 B2 | 9/2005 | Brown | 385/92 |
| 7,010,204 B2* | 3/2006 | Reith | G02B 6/03627 385/128 |
| 7,106,928 B2* | 9/2006 | Dykaar | G02B 6/02085 385/124 |
| 7,194,016 B2* | 3/2007 | Bullington | G02B 6/34 372/108 |
| 7,296,939 B2* | 11/2007 | Sonoda | G02B 6/4248 385/88 |
| 7,551,823 B2* | 6/2009 | Reith | G02B 6/03627 385/123 |
| 7,580,600 B1* | 8/2009 | Starodubov | G02B 6/4296 385/124 |
| 8,027,555 B1* | 9/2011 | Kliner | G02B 6/2852 385/29 |
| 8,811,789 B2* | 8/2014 | Reith | G02B 6/03627 385/126 |
| 8,876,811 B2* | 11/2014 | Lewinsky | A61B 18/22 606/16 |
| 2003/0068138 A1 | 4/2003 | Jack et al. | 385/80 |
| 2004/0020896 A1 | 2/2004 | Dasgupta et al. | 216/24 |
| 2004/0165637 A1* | 8/2004 | Bullington | G02B 6/34 372/50.11 |
| 2004/0175074 A1* | 9/2004 | Dykaar | G02B 6/02085 385/37 |
| 2004/0175086 A1* | 9/2004 | Reith | G02B 6/03627 385/128 |
| 2005/0058411 A1 | 3/2005 | Finot et al. | 385/94 |
| 2005/0220403 A1* | 10/2005 | Dykaar | G02B 6/02085 385/31 |
| 2005/0259918 A1 | 11/2005 | Coleman | 385/33 |
| 2006/0018609 A1* | 1/2006 | Sonoda | G02B 6/4248 385/93 |
| 2006/0062532 A1* | 3/2006 | Reith | G02B 6/03627 385/123 |
| 2007/0292087 A1 | 12/2007 | Brown | 385/92 |
| 2009/0052857 A1 | 2/2009 | Skidmore et al. | 385/137 |
| 2009/0238526 A1* | 9/2009 | Reith | G02B 6/03627 385/128 |
| 2011/0087202 A1* | 4/2011 | Lewinsky | A61B 18/22 606/14 |
| 2012/0316549 A1* | 12/2012 | Lewinsky | A61B 18/22 606/16 |
| 2013/0177283 A1 | 7/2013 | Theuerkorn et al. | 385/113 |
| 2014/0205252 A1 | 7/2014 | Tafoya et al. | 385/123 |
| 2014/0241385 A1* | 8/2014 | Fomin | G02B 6/4296 372/6 |
| 2015/0057649 A1* | 2/2015 | Lewinsky | A61B 18/22 606/18 |

* cited by examiner

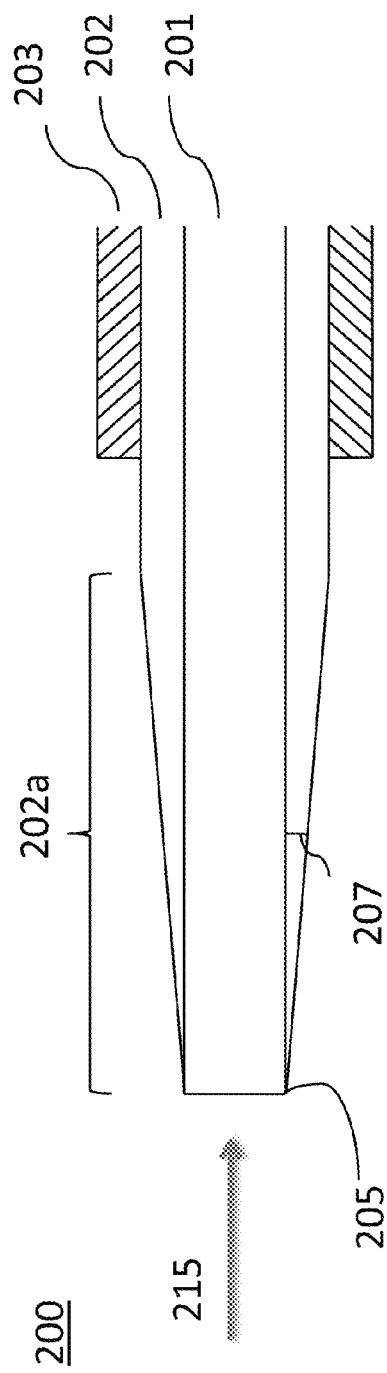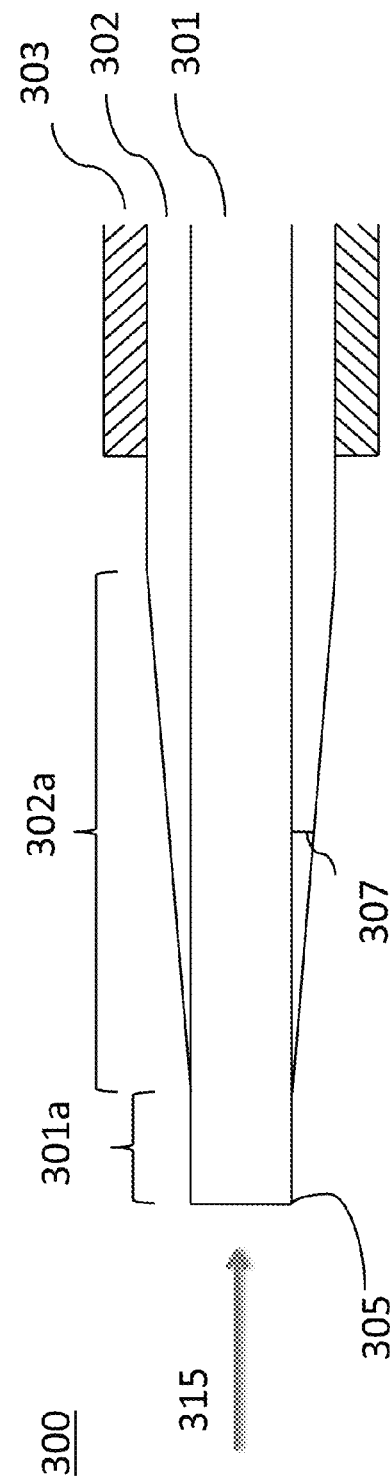

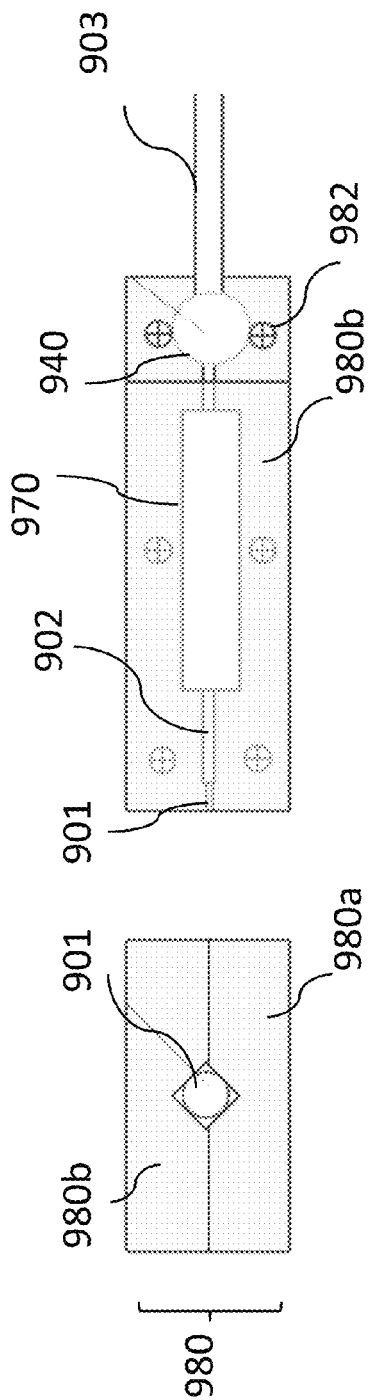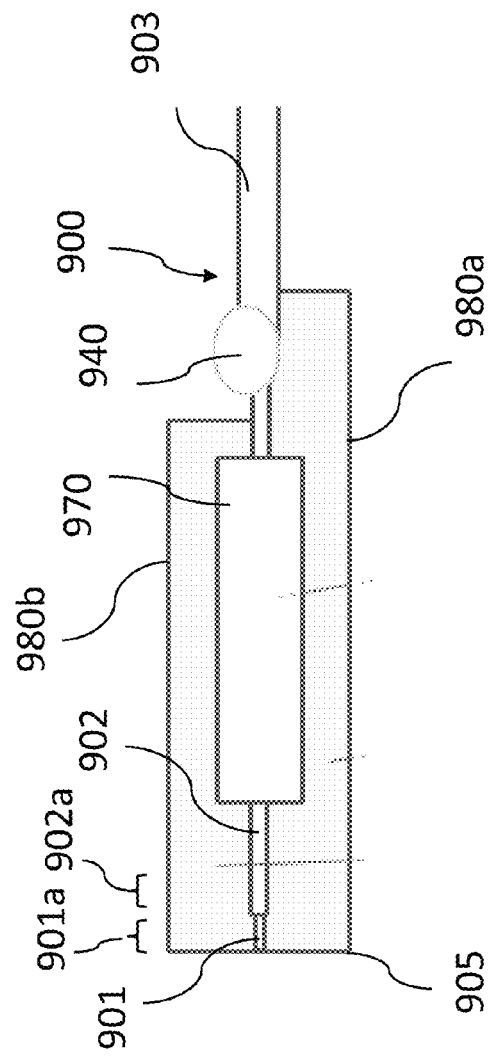

HIGH POWER MISALIGNMENT-TOLERANT FIBER ASSEMBLY

TECHNICAL FIELD

The embodiments disclosed herein relate generally to coupling high power light into optical fiber, and more specifically to an optical fiber assembly for coupling high power light into an optical fiber.

BACKGROUND

Coupling light from high power light sources, such as lasers, into optical fibers has become increasingly useful in many applications, including for example, optical communication, materials processing, medicine, and military applications.

Optical fiber typically is comprised of a central core, a cladding layer surrounding the core, and a buffer layer that surrounds and protects the cladding. When light is properly coupled into optical fiber it is directed into the core, which with the cladding is designed to contain and guide the light along the length of the fiber. However, coupling from high energy sources of light is rarely perfect and some optical energy may stray into the cladding, the buffer layer, and/or the surrounding environment. This errant high power light can heat the optical fiber and/or surroundings to the point that there is significant damage and/or destruction within the system. In particular, it is well known that errant high power light can damage the buffer layer of an optical fiber. As a result, it is common to strip the buffer layer from the input end of an optical fiber before mounting it.

However, even with the buffer layer partially removed, if the high power light directed to the input core of the optical fiber is misaligned then at least a portion of the light may 1) enter the fiber cladding, 2) illuminate the fiber holder, and/or 3) reflect back to the source. In each case, this errant high power can cause catastrophic damage to the fiber and/or laser module, or collateral damage to other components located nearby the fiber. For example, stray energy that is coupled into the cladding may propagate and cause damage to the buffer layer further along the optical fiber and/or to the adhesive used to secure the optical fiber to the mount.

In view of the foregoing, it may be understood that there are significant problems and shortcomings associated with current solutions and technologies for coupling high power light into an optical fiber.

SUMMARY

Fiber burning and/or overheating of the fiber feedthrough in high-power laser modules, which may cause catastrophic and/or collateral damage, may be addressed by providing an optical fiber assembly designed to withstand overheating due to errant high power laser light that is directed toward the input core of a fiber but is at least partially misaligned. In one embodiment, the optical fiber assembly includes a mount having a bore, wherein the end of the optical fiber, which is disposed within the bore, extends past the bore to a focal plane of the light source. More specifically, a section of the optical fiber wherein the cladding is at least partially removed extends past the bore. A length of this section of optical is selected to reduced the amount of light captured by the cladding and/or to leak the light out quickly. Advantageously, each optical fiber assembly may be relatively simple and/or require fewer parts than prior art optical fiber assemblies.

In accordance with embodiments described herein, there is provided an optical fiber including a core and a cladding, the optical fiber having an end face for receiving incident light, the core and cladding for guiding the incident light along the optical fiber in a light propagation direction; and, a mount for supporting the optical fiber, the mount including a passageway extending therethrough for receiving the optical fiber, the optical fiber disposed such that a portion of the optical fiber extends outward from an opening of the passageway to a focal plane of the incident light, wherein an end of the optical fiber includes at least one of a bare core section and a tapered cladding region, the bare core section having a length that is at least 75 times greater than a maximum cladding thickness of the optical fiber, a thickness of the cladding in the tapered cladding region increasing in the light propagation direction, the tapered cladding region having an average taper angle that is less than about 5°.

In accordance with embodiments described herein there is provided an optical fiber including a core and a cladding, the optical fiber having an end face for receiving incident light, the core and cladding for guiding the incident light along the optical fiber in a light propagation direction; and, a mount for supporting the optical fiber, the mount including a passageway extending therethrough for receiving the optical fiber, the optical fiber disposed such that a portion of the optical fiber extends outward from an opening of the passageway to a focal plane of the incident light, wherein an end of the optical fiber includes a bare core section, the bare core section having a length that is at least 75 times greater than a maximum cladding thickness of the optical fiber.

In accordance with embodiments described herein there is provided an optical fiber assembly comprising: an optical fiber including a core and a cladding, the optical fiber having an end face for receiving incident light, the core and cladding for guiding the incident light along the optical fiber in a light propagation direction; and, a mount for supporting the optical fiber, the mount including a passageway extending therethrough for receiving the optical fiber, the optical fiber disposed such that a portion of the optical fiber extends outward from an opening of the passageway to a focal plane of the incident light, wherein an end of the optical fiber includes a tapered cladding region, a thickness of the cladding in the tapered cladding region increasing in the light propagation direction, the tapered cladding region having an average taper angle that is less than about 5°.

BRIEF DESCRIPTION OF THE DRAWINGS

In order to facilitate a fuller understanding of the exemplary embodiments, reference is now made to the appended drawings, in which like elements are referenced with like numerals. These drawings should not be construed as limiting the present disclosure, but are intended to be illustrative only.

FIG. 2 is a schematic diagram of an optical fiber having a cladding layer with a tapered region, according to an exemplary embodiment.

FIG. 3 is a schematic diagram of an optical fiber having a cladding layer with a tapered region and a core with an exposed region, according to an exemplary embodiment.

FIG. 9a is a front view of an optical fiber assembly having a two-part mount, according to an exemplary embodiment.

FIG. 9b is a top view of the optical fiber assembly shown in FIG. 9A.

FIG. 9c is a side view of the optical fiber assembly shown in FIG. 9A.

DETAILED DESCRIPTION

An optical fiber propagates light that enters the fiber within a certain angle range, which is conventionally referred to as the angular acceptance cone of the fiber. Accordingly, the angular acceptance cone, which is dependent on the diameter of the fiber core and the numerical aperture (NA) of the fiber, at least partially determines the coupling efficiency of light directed into the optical fiber.

Figure 1:
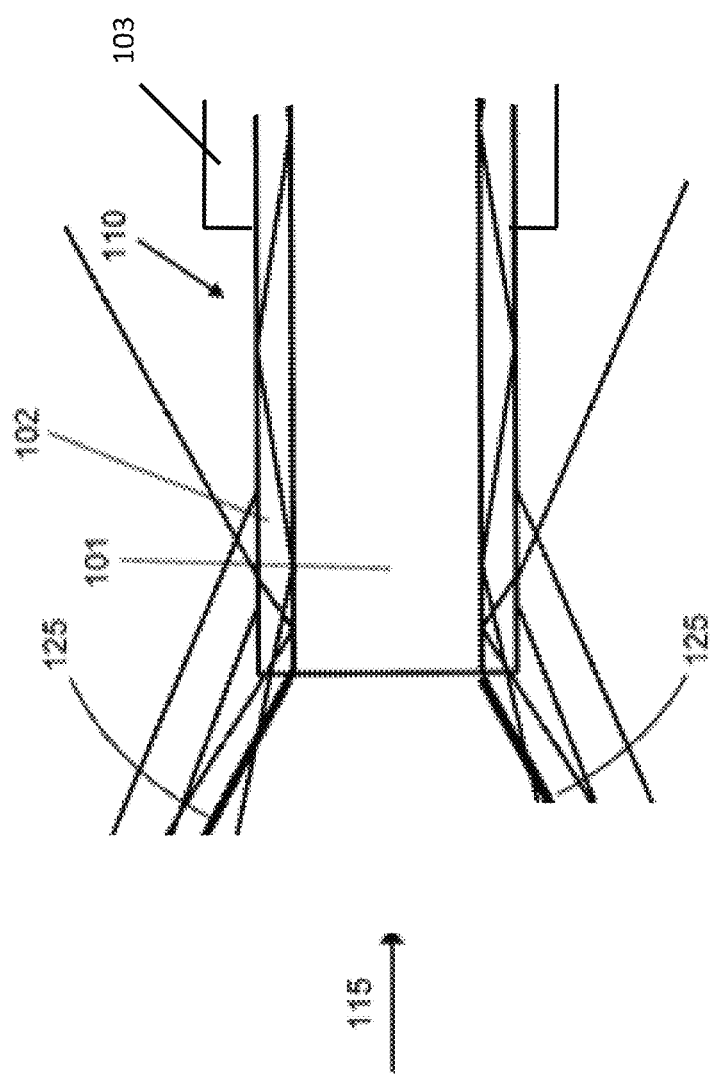
FIG. 1 is a schematic diagram illustrating a cross sectional view of an optical fiber having a core and cladding, the optical fiber optically coupled to a high power light source, according to an exemplary embodiment.

Referring to FIG. 1, incident light 115 within the acceptance cone 125 may propagate along the core 101 of the optical fiber 100 as guided by the lower refractive index cladding 102. In contrast, incident light 115 outside of the angular acceptance cone 125 may be coupled directly into the cladding 102 or scattered into the area surrounding the fiber. Some of the incident light may also be directed into the buffer layer 103, either directly or through the cladding. In each case, as described above, this errant light may damage the cladding 102, the buffer 103, adhesives used in the assembly, and/or even the core 101, due to thermal effects.

FIG. 2 is a schematic diagram of an optical fiber 200 wherein a portion of the cladding 202 may be removed near the input end of the optical fiber, thus reducing the amount of incident light coupled therein. Referring to FIG. 2, incident light 215 focused at focal plane 205 (e.g., having a beam waist at the focal plane 205) may be directed largely into the optical fiber core 201, which is at least partially surrounded with a cladding layer 202 and an optional buffer layer 203. The cladding layer 202 may include a transition region 202a wherein a thickness of the cladding is varied (e.g., tapered) such that it is thinner and/or negligible near the focal plane 205. The tapered region 202a may transition from the thinner end to the thicker end with a taper angle 207 that is less than 5° relative to the fiber axis (i.e., the angle of the transition is greater than 85° relative to the fiber endface (e.g., or focal plane 205) such that the transition is nearly parallel to the fiber axis).

FIG. 3 is a schematic diagram of an optical fiber 300 wherein a portion of the cladding 302 may be removed near the input end of the optical fiber, thus reducing the amount of incident light coupled therein. Referring to FIG. 3, incident light 315 focused at focal plane 305 may be directed largely into the optical fiber core 301, which is at least partially surrounded with a cladding layer 302 and an optional buffer layer 303. The fiber core 301 may include an exposed region 301a where the cladding layer 302 is absent or has a negligible thickness. The cladding layer 302 may include a transition region 302a wherein a thickness of the cladding is varied (e.g., tapered) such that it is thinner on the incident light side (e.g., left side of FIG. 3). The tapered region 302a may transition from the thinner end to the thicker end with a taper angle 207 that is less than 5° relative to the fiber axis (i.e., the angle of the transition is greater than 85° relative to the fiber endface (e.g., or focal plane) such that the transition is nearly parallel to the fiber axis). In this embodiment, the exposed region 301 of the fiber core may provide further physical separation between the cladding 301 and the beam waist, thus further minimizing the amount of light incident on the cladding.

Figure 4:
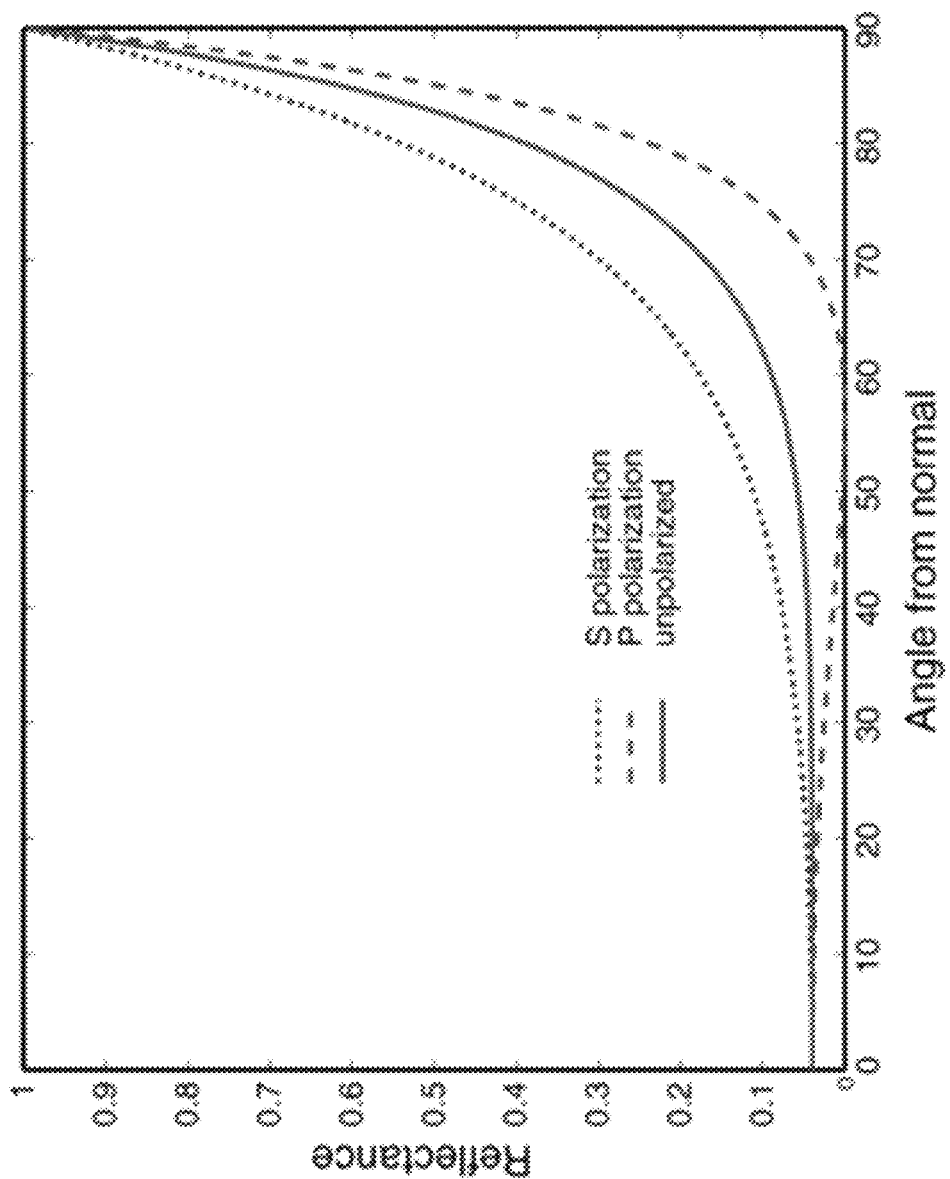
FIG. 4 is an illustrative plot of reflectance versus incident angle from normal, in degrees, for a fluorosilicate (n=1.435) surface, according to an exemplary embodiment.

Advantageously, in each optical fiber 200/300, the slow transition between the thinner end and the thicker end of the tapered region may cause most of the light impinging thereon to be reflected away and not refracted into the fiber core. For example, referring to the Fresnel reflectance curves illustrated in FIG. 4, if the angle of incidence of a beam of light is greater than 85°, then the reflectance will be about 0.7 for all incident light. In other words, more than half of the light may be reflected away. Since light propagating in a direction parallel to the fiber axis will have an angle of incidence with the cladding that is substantially the same as the transition angle, transition angles greater than 85° relative to the fiber endface (e.g., or focal plane) may result in more than half of the light being reflected away and thus not refracted into the fiber core. Moreover, if the transition angle is greater than 87°, than most of the light incident on the cladding may be reflected away. In addition, the tapered sections prevent any grazing light from refracting into the fiber (e.g., >43°, per Snell's law).

Further advantageously, light captured by the cladding may propagate as high NA cladding modes, reflecting several times in a short distance, which may be quickly stripped out by an index matching medium and suitable heat sink. Without the tapered section, low NA light may be launched into the cladding and propagate some distance down the fiber. Accordingly, the tapered sections 202a/302a may obviate the vexing challenge of how to strip low NA cladding light, which may cause fiber failures, away from the fiber. Notably, providing a longer taper section may result in more cladding light being leaked. For example, providing a taper section having a length that is about 10 times greater than a thickness of the cladding may result in most cladding light exiting.

Referring to Table 1, which has been calculated for a multimode optical fiber having a 200 μm core (i.e., radius of core is 100 μm) and a 240 μm cladding layer (i.e., thickness of cladding layer is 20 μm), relatively large transition angles (e.g., greater than about 85° relative to the fiber endface) typically may result in a relatively long transition region.

TABLE 1

Calculated transition lengths for various transition angles (relative to fiber endface) for a cladding thickness of 20 μm

| Transition Angle | Taper Angle | Transition Length |
| --- | --- | --- |
| 45° | 45° | 20 μm |
| 64° | 26 | 41 μm |
| 85° | 5 | 229 μm |
| 87.5 | 2.5 | 458 μm |

For example, for a multimode optical fiber having a 62.5 μm core (i.e., radius of core is about 31 μm) and a 125 μm cladding layer (i.e., thickness of cladding layer is about 31

μm), a transition angle greater than 85° relative to the fiber endface may provide an approximately 354 μm long transition region. In each case, the relatively large transition angles (e.g., greater than about 85°) may provide a transition length that is more than 10 times greater than the cladding thickness.

In accordance with one embodiment, the optical fiber may be a multimode optical fiber and the relatively long transition region is achieved with a wet etching process. For example, in one embodiment, the multimode optical fiber may include a silica core and a fluorosilicate cladding, and the tapered region may be formed by dipping the fully clad optical fiber in an etching solution (e.g., a hydrofluoric acid solution or a buffered solution containing, for example, hydrofluoric acid and ammonium fluoride) and slowly pulling the optical fiber upwards out of the solution at a constant rate. The region of the cladding that remains within the etching solution for a longer period of time may be etched to a greater extent, thus conveniently providing the taper. Since there is an approximately 5× selectivity in etch rate for a fluorosilicate cladding versus a pure silica core (i.e., in multimode fibers), the core may provide a convenient etch stop. Accordingly, a totally exposed region of the core (e.g., 301a) may be formed by leaving the tip of the optic fiber in the etching solution for a longer time (i.e., while the fiber is not moved).

Advantageously, this wet etching process may allow the silica core to be etched to produce a very smooth surface finish so that light is guided by total internal reflection (TIR) within the etched section. Further advantageously, this wet etching process may provide a simple method of keeping the angle of the transition to greater than 85° relative to the fiber endface so that most of the light hitting the transition region will be reflected away and not refracted into the fiber.

Figure 5:
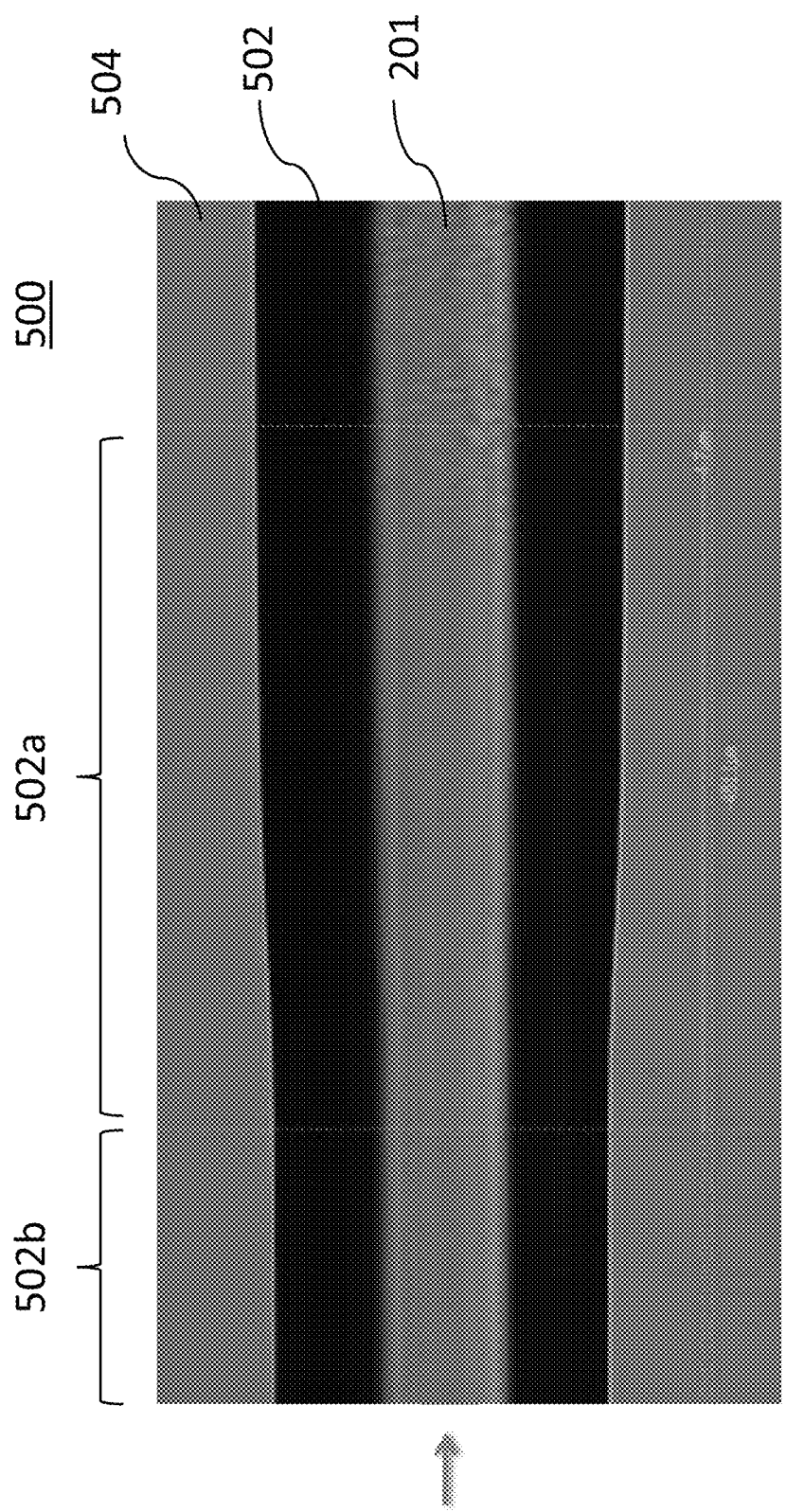
FIG. 5 is an illustrative optical micrograph of an optical fiber having a tapered cladding layer, according to an exemplary embodiment.

Referring to FIG. 5, there is shown an optical micrograph of an optical fiber having a tapered region. More specifically, FIG. 5 shows a multimode optical fiber 500 including a 200 μm silica core 501 and a 240 μm fluorosilicate cladding 502 in air 504. The tapered cladding region 502a may be approximately 450 μm long, providing a transition angle that is about 87.5°. The tapered cladding region 502 may be formed using a wet etching process, wherein the fiber is dipped into a HF solution. In this embodiment, the HF solution may be a 37% by weight solution. In other embodiments, the HF solution may be between 10-50% by weight. To prevent HF vapors from damaging or discoloring the fiber coating, a thin layer (~1 mm) of liquid paraffin or light mineral oil may optionally provide on a surface of the HF bath. Alternatively, a Teflon loose tube may be used to protect the fiber coating. One method that may be used to form a taper in a glass fiber is found in U.S. Pat. No. 6,905,627, which is hereby incorporated by reference in its entirety. Notably, the left side may face the input light, so that the diameter of the glass cladding may increase as the light propagates from left to right.

In accordance with other embodiments, the relatively long transition region may be achieved with a laser etching process. For example, in one embodiment, the optical fiber may include a silica core and a fluorosilicate cladding and the tapered region may be formed by rotating the optical fiber while irradiating the cladding with a femto-second laser. In accordance with yet another embodiment, the relatively long transition region may be achieved with another process for at least partially removing the cladding layer.

In each case, the method may be designed such that the core is not-etched and such that the endface of the core is aligned with the focal plane of the incident light, thus advantageously allowing maximum light coupling into the core.

As discussed above, providing an optical fiber having a tapered cladding section with a transition angle that is greater than 85° may mitigate at least one of the well-known problems arising from by misaligned light (i.e., high-power light being launched directly into fiber cladding). In particular, when the angle of transition is greater than 85°, less of the light incident on the cladding may be transmitted therein and/or may exit relatively quickly. In addition, when the tapered section is separated from the focal plane by a predetermined distance (i.e., by a section of optical waveguide having no cladding layer), then the cladding may be disposed farther from the focal plane of the incident light, thus further reducing the amount of light incident thereon. In fact, if the distance between the start of the cladding and the focal plane is sufficiently large, then only a negligible amount of light may enter the cladding, even if the optical fiber does not have a tapered cladding section.

Accordingly, in one embodiment, the problem of high power light being launched directly into the fiber cladding may be solved by providing sufficient distance between the cladding layer and the focal plane. For example, in one embodiment, the cladding layer may be physically separated from the focal plane by a section of optical fiber wherein the cladding has been entirely removed (e.g., etched away). In another embodiment, the separation may be provided by attaching (e.g., fusion splicing) a short length of pure silica fiber (i.e., which is known as a coreless fiber or coreless end cap) to the end of the optical fiber. The coreless optical fiber, which is not surrounded by a cladding layer, may have an outer diameter (OD) that is approximately equal to or less than the core diameter of the optical fiber. For example, a piece of 200 μm OD coreless optical fiber may be spliced to a step index fiber with 200 μm core and 240 μm cladding. Light entering the coreless fiber may be guided by TIR, and couple into the core of the optical fiber. If the coreless fiber is sufficiently long, almost all errant light from a focused beam missing the input facet of the coreless fiber may also miss the cladding of the step index fiber. For example, if the 200 μm coreless fiber is 2 mm long, and the focused beam is uniformly distributed within a numerical aperture of 0.15, the amount of light that may enter the 240 μm cladding is reduced by ~97%. In fact, multi-mode optical fibers having bare core sections (e.g., wherein the cladding has been etched, or is formed from a coreless end cap) with lengths that are greater than 1 mm, and in particular, greater than 2 mm have been shown to provide exceptional results. In general, very little errant light is expected to enter the cladding if the cladding is spaced from the focal plane of the incident light by a distance that is more than approximately 75 times greater than the cladding thickness. Negligible errant light is expected to enter the cladding if the cladding is spaced from the focal plane of the incident light by a distance that is more than approximately 100 times greater than the cladding thickness. For example, if the cladding thickness is 20 μm, then the cladding may be at least 2.0 mm from the end of the optical fiber. Similarly, if the cladding thickness is 10 μm, the cladding may be at least 1.0 mm from the end.

As discussed above, the problem of high power light being launched directly into the fiber cladding may be solved by providing sufficient distance between the cladding layer and the focal plane and/or by providing a tapered cladding region having a transition angle that is greater than 85°. Another problem, which arises when misaligned light irradiates the filter holder, and thus damages the mechanism used to mount the optical fiber, may be addressed with the fiber mount design.

In general, the optical fiber may be mounted in a fixed position relative to the high power light source. More specifically, the optical fiber may be attached to or within a package including the high power light source using some sort of optical fiber assembly (e.g., also called a fiber tail assembly (FTA)). For example, two of the more widely used techniques of attaching an optical fiber to a wall of or within an opto-electronic package include 1) solder attachment of a metallized optical fiber, and 2) laser welding of an optical fiber assembly. For example, in one well-known technique a portion of the buffer layer of the optical fiber may be removed and coated with a metallized coating, which allows the optical fiber to be easily soldered into position to metal pads within a housing (e.g., with or without a metal sleeve). While this approach is commonly used for low power fiber attachment, metallized fiber is not ideal for high power applications. In another well-known technique, the optical fiber may be secured within the optical fiber assembly with an adhesive, such as epoxy. For example, one common prior art method of mounting optical fibers includes stripping the buffer layer from the end of an optical fiber, applying a small amount of adhesive to the exposed fiber (i.e., wherein the buffer layer has been stripped), and the feeding the optical fiber through a ferrule or other type of mount. Alternatively, the adhesive may be applied after the optical fiber is fed into the ferrule (e.g. through a hole designed for applying the adhesive). Once the adhesive is cured, the optical fiber may be trimmed and polished such that the end of the ferrule and the end of the optical fiber are flush. In each case, errant high power light incident on the holder may damage the mechanism used to mount the optical fiber. For example, high power errant light may heat the fiber and damage the solder joints or epoxy, causing thermally induced reliability problems.

Figure 6:
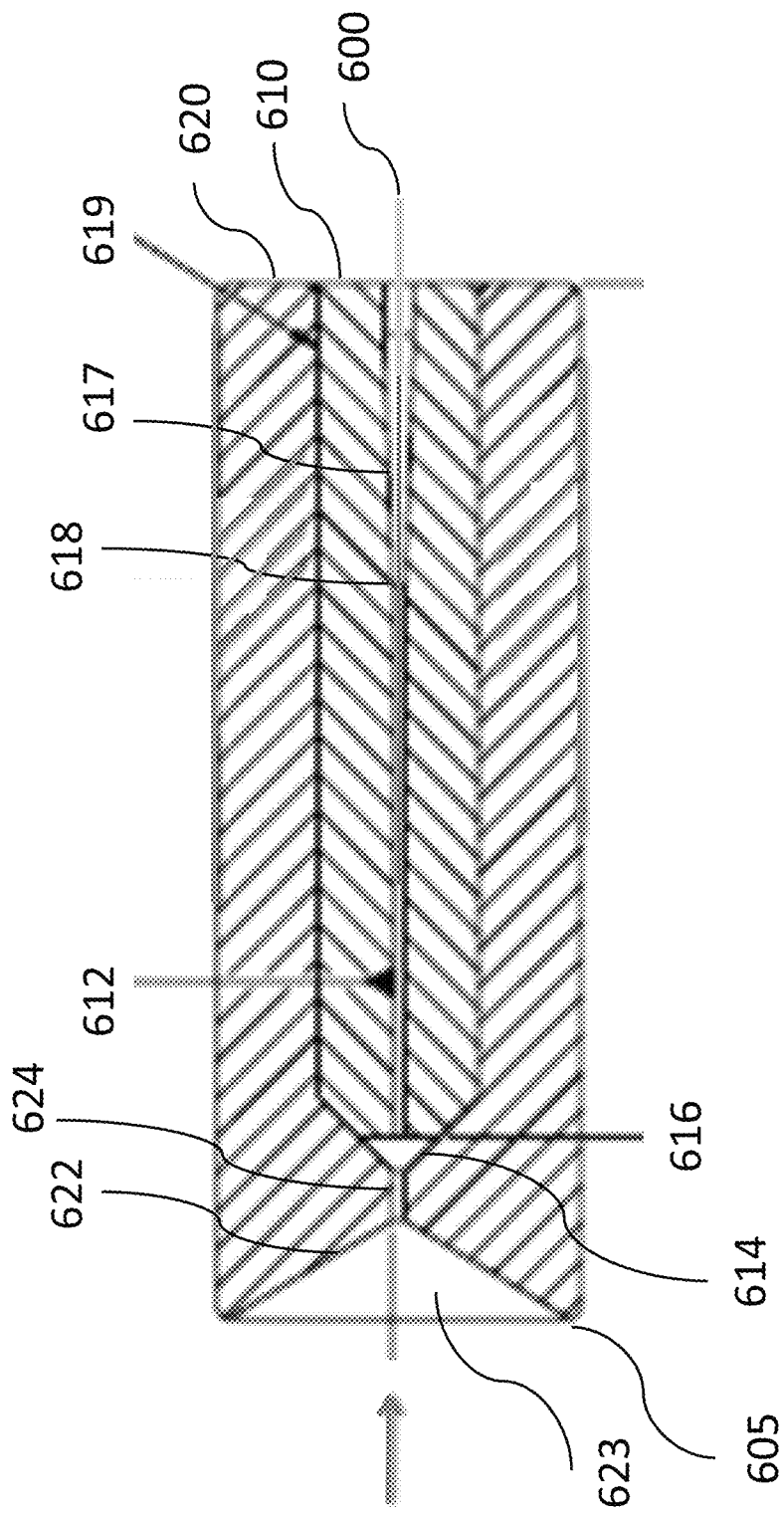
FIG. 6 is a schematic diagram of an optical fiber assembly with a ferrule, according to an exemplary embodiment.

Referring to FIG. 6, there is shown an embodiment of an optical fiber assembly, which may include the optical fiber 600, a ferrule 610, and a bulkhead 620.

The optical fiber 600 may be an optical fiber having a core and a cladding, which may be fabricated from any waveguide material such as glass or polymer. In general, the index of refraction of the cladding material may be lower than the index of refraction of the core material so that light may be kept in the core by TIR. Optionally, the optical fiber includes a buffer layer (not shown), which may be stripped from the end of optical fiber so that it does not enter the ferrule 610 or such that it enters the ferrule minimally. For example, in one embodiment, the optical fiber may be a multi-mode optical fiber having a silica core, a fluorosilicate cladding, and an acrylate buffer layer. In another embodiment, the optical fiber may be a single mode optical fiber having a silica core, a fluorosilicate cladding, and an acrylate buffer layer.

In one embodiment, the cladding of the optical fiber 600 may include a transition region wherein a thickness of the cladding is varied (e.g., tapered) such that it is thinner and/or negligible on the side closest to the focal plane 605 and increases in the direction of incident light propagation. In general, the taper angle may be relatively small. For example, in one embodiment the taper angle is less than 5° relative to the fiber axis (i.e., the angle of the transition is greater than 85° relative to the fiber input endface such that the transition is nearly parallel to the fiber axis). In another embodiment the taper angle is less than 3° relative to the fiber axis (i.e., the angle of the transition is greater than 87° relative to the fiber input endface such that the transition is nearly parallel to the fiber axis). Advantageously, designing the optical fiber 600 such that the taper angle is less than 3° may result in very little light entering the cladding layer. In general, the transition region (i.e., the region wherein there is a cladding thickness gradient) may be relatively long. For example, in one embodiment the length of the transition region may be more than 10 times greater than the cladding thickness. In one embodiment, the transition region may begin at the end of the optical fiber. In another embodiment, the transition region is spaced apart from the end of the optical fiber by a section of exposed optical fiber (i.e., bare core fiber wherein the cladding has been entirely removed) or by a section of optical fiber having a relatively thin cladding layer (e.g., wherein the cladding has been uniformly reduced by etching). In one embodiment the section of exposed optical fiber may be more than ~75 times greater than the cladding thickness. In one embodiment, the transition region has a relatively uniform gradient (i.e., the taper angle is constant throughout the transition region). In other embodiments, the transition region may include some small variation in taper angle. For example, in some embodiments, the fabrication process may introduce small variations in taper angle throughout the transition region. In these embodiments, the average taper angle within the transition region may be less than 5°.

In another embodiment, an end section of the optical fiber may include a relatively long bare core section. In this embodiment, since the cladding does not have a tapered region, the amount of errant light coupled into the cladding may be reduced primarily by providing sufficient distance between the end of the optical fiber and the cladding. In particular, the cladding layer may be physically separated from the end of the optical fiber (i.e. and thus focal plane) by a section of optical fiber that does not have a cladding layer. For example, in one embodiment, the end of the optical fiber may be etched to provide the relatively long bare core section (i.e., having no cladding). In another embodiment, the separation may be provided by attaching (e.g., fusion splicing) a short length of pure silica fiber (i.e., which is known as a coreless fiber or coreless end cap) to the end of the optical fiber. The coreless optical fiber, which is not surrounded by a cladding layer, may have an out diameter (OD) that is approximately equal to or less than the core diameter of the optical fiber. For example, a piece of 200 μm OD coreless optical fiber may be spliced to a step index fiber with 200 μm core and 240 μm cladding. Light entering the coreless fiber may be guided by TIR, and couple into the core of the optical fiber. In general, the farther the cladding is from the end of the optical fiber (i.e., and thus focal plane), the less errant light will enter the cladding. In particular, if the coreless fiber is sufficiently long, almost all errant light from a focused beam missing the input facet of the coreless fiber may also miss the cladding of the step index fiber. For example, if the 200 μm coreless fiber is 2 mm long, and the focused beam is uniformly distributed within a numerical aperture of 0.15, the amount of errant light that may enter the 240 μm cladding is reduced by ~97%. In general, very little errant light may enter the cladding if a length of the bare core section (e.g., etched or coreless end cap) is more than ~75 times greater than the cladding thickness. Negligible errant light may enter the cladding if the length of the bare core section is more than ~100 times greater than the cladding thickness. Accordingly, if the cladding thickness is 20 μm, then the length of the bare core section may be least 1.5 mm, and preferably may be greater than ~2.0 mm.

The ferrule 610 may be an elongated body having a passageway 612, a chamfered leading edge 614 (e.g., an approximately 120° chamfer), and a flat end face 616. The chamfered leading edge 614 may prevent reflected light from returning to the source. The passageway 612 has an internal diameter (ID) that is at least slightly larger than the diameter of the optical fiber 600 such that the optical fiber fits therein. The passageway 612 may include a chamfer 617 at the back end of the ferrule such that the ID of the passageway is smaller at the front end than at the back end. For example, in one embodiment the section of the passageway at the front end may have a close fitting ID, which may be one to a few micrometers larger than the diameter of clad optical fiber, whereas the section of the passageway having the largest ID may be at the output endface.

Advantageously, providing a larger ID on the output end allows the optical fiber to be secured within the ferrule by applying an adhesive (e.g., epoxy) near the back end 619 of the ferrule (e.g., in chamfer 617), whereas providing a providing a close fitting ID at the front end may prevent potential wicking of the adhesive (e.g., through capillary action) to the front of the ferrule, where the risk of burning by errant light is greatest. For example, as a result of the close-fitting ID on the input side, epoxy applied to the fiber in the chamfer region 617 is not expected to wick past the end of the chamfer 618. Preventing wicking of adhesive may also result in an epoxy-free tapered region, which may be advantageous because any epoxy on the tapered region of the optical fiber 600 could negatively affect both the TIR in the core and grazing angle reflection at the cladding. In addition, the close fitting ID of the ferrule also provides alignment stability of the fiber to within 1 μm, limiting coupling efficiency losses to about 1% for a 105 μm core fiber.

In general, the ferrule 610 may be prepared from a material having good machinability, smooth surface, and/or low absorption at the wavelength of the high power incident light (e.g. the laser wavelength). For example, in one embodiment the ferrule material is ceramic. In another embodiment, the ferrule material may be a metal or a plastic. The ferrule may be press fit or bonded into the bulkhead 620 by means of epoxy or solder.

The bulkhead 620, which may support the ferrule 610, may have a recessed surface 622 at the front end. The recessed surface 622, which may be outwardly tapered at an obtuse angle (e.g., a 120° full angle), may reflect any errant light that strikes the front end away from the light source, thus avoiding potential damage and/or instability of the light source. In one embodiment, the bulkhead 620 may be fabricated from a metal having high thermal conductivity (e.g., Cu or Al), which conducts heat created by optical absorption at the metal surface away from the surface.

The bulkhead 620 may have a small diameter bore 624 concentric with the ferrule 610 and the recess 623, which is slightly larger than the diameter of the section of the optical fiber 600 therein. For example, in one embodiment, the diameter of the bore 624 may be a few microns larger than the diameter of the section of optical fiber 600. In one embodiment, the end of the optical fiber 600 may protrude from the end of the ferrule 610 through the metal bore 624 by about 1-2 mm and may be flush with the end of the bulkhead (e.g., at the focal plane 605). Allowing the tip of the optical fiber 600 to extend into the recess 623 advantageously provides some distance between the bulkhead 620 and the fiber tip, thus significantly reducing the amount of light coupled into the cladding. In one embodiment, the optical fiber may include a tapered cladding region, as discussed above, which is disposed within the bore 624. In other embodiments, the optical fiber may include a tapered cladding region, as discussed above, which is disposed within the within the recess 623. In another embodiment, the optical fiber may include a bare core section, which is entirely disposed within the recess 623, and a stepped index section, which is disposed within the bore 624. In yet another embodiment, the optical fiber may include a bare core section, which is disposed within the recess 623 and bore 624, and a stepped index section, which is disposed within the bore 612. Notably, reasonable stability has been exhibited even when the optical fiber extends past the supporting structure by 5 mm. This relatively high stability, which may be at least partially achieved via the narrow aperture hole(s), advantageously allows 2-3 mm coreless end caps to be used, and thus may reduce the amount of light that can enter the cladding by about 97%. In fact, it has been found that separating the cladding from the end of the optical fiber (i.e., the focal plane) by distances that are over 1.5 mm, and particularly over 2.0 mm, may sufficiently prevent enough light from entering the cladding that additional mechanisms (e.g., a separate reflector) are not required.

Figure 7:
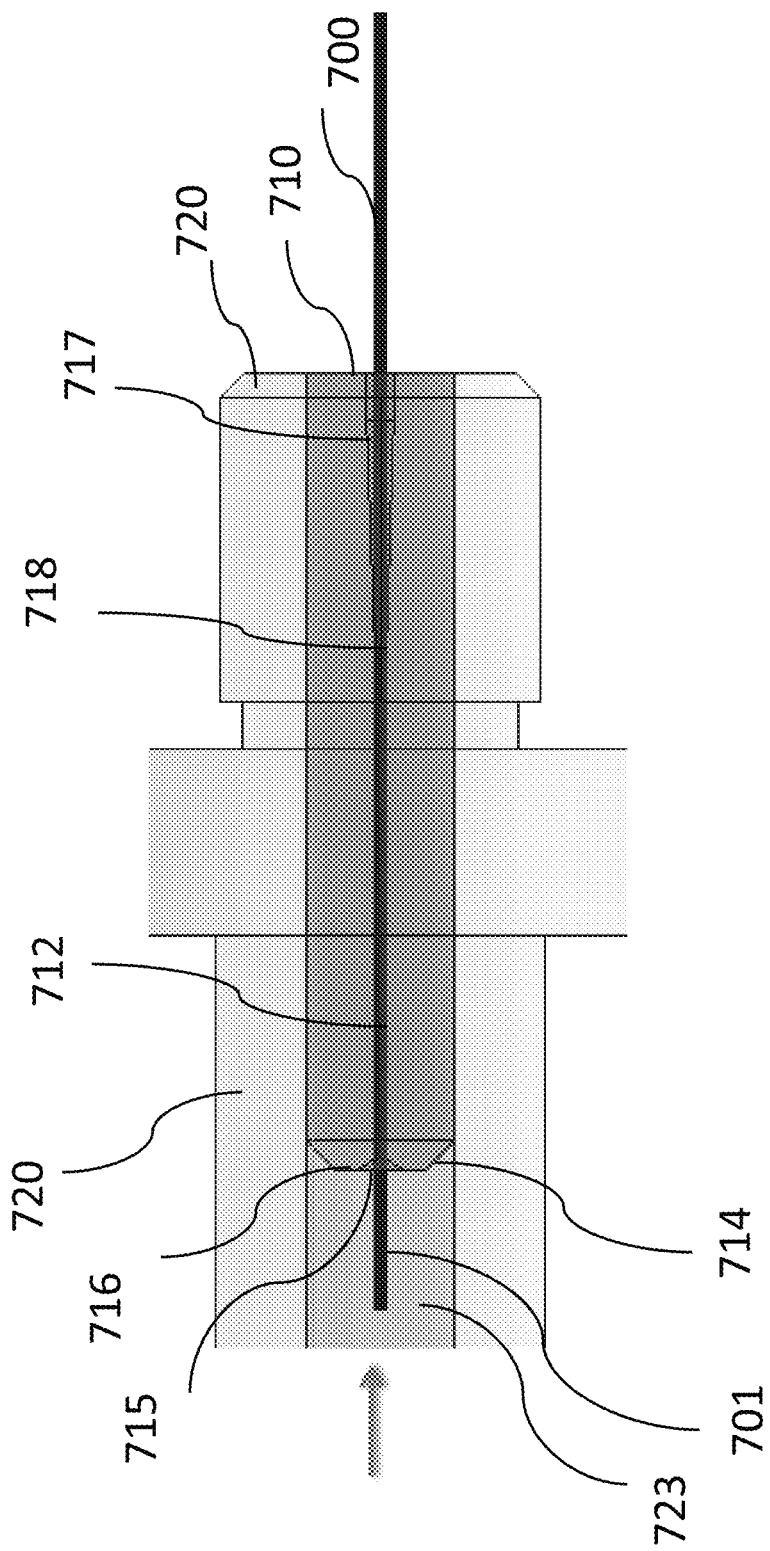
FIG. 7 is a schematic diagram of an optical fiber assembly with a ferrule having a reflective surface, according to an exemplary embodiment.

Referring to FIG. 7, there is shown an embodiment of an optical fiber assembly, which may include the optical fiber 700, a ferrule 710, and a bulkhead 720.

The optical fiber 700 may be an optical fiber having a core and a cladding, which may be fabricated from any waveguide material such as glass or polymer. In general, the index of refraction of the cladding material may be lower than the index of refraction of the core material so that light may be kept in the core by TIR. Optionally, the optical fiber includes a buffer layer (not shown), which may be stripped from the end of optical fiber so that it does not enter the ferrule 710 or enters the ferrule minimally. For example, in one embodiment, the optical fiber may be a multi-mode optical fiber having a silica core, a fluorosilicate cladding surrounding the silica core, and an acrylate buffer layer surrounding the fluorosilicate cladding. In another embodiment, the optical fiber may be a single mode optical fiber having a silica core, a fluorosilicate cladding, and an acrylate buffer layer.

In one embodiment, the cladding of the optical fiber 700 may include a transition region wherein a thickness of the cladding is varied (e.g., tapered) such that it is thinner and/or negligible on the side closest to the focal plane 705 and increases in the direction of incident light propagation. In general, the taper angle may be relatively small. For example, in one embodiment the taper angle is less than 5° relative to the fiber axis (i.e., the angle of the transition is greater than 85° relative to the fiber input endface such that the transition is nearly parallel to the fiber axis). In another embodiment the taper angle is less than 3° relative to the fiber axis (i.e., the angle of the transition is greater than 87° relative to the fiber input endface such that the transition is nearly parallel to the fiber axis). Advantageously, designing the optical fiber 700 such that the taper angle is less than 3° may result in very little light entering the cladding layer. In general, the transition region (i.e., the region wherein there is a cladding thickness gradient) may be relatively long. For example, in one embodiment the length of the transition region may be more than 10 times greater than the cladding thickness. In one embodiment, the transition region may begin at the fiber input endface. In another embodiment, the transition region may begin at a location separated from the input endface by a section of exposed optical fiber (i.e., wherein the cladding has been entirely removed) or by a section of optical fiber having a relatively thin cladding layer (e.g., wherein the cladding has been uniformly reduced by etching). In one embodiment the section of exposed optical fiber may be more than ~75 times greater than the cladding thickness. In one embodiment, the transition region may have a relatively uniform gradient (i.e., the taper angle is constant throughout the transition region). In other embodiments, the transition region may include some small variation in taper angle. For example, in some embodiments, the fabrication process may introduce small variations in taper angle throughout the transition region. In these embodiments, the average taper angle within the transition region may be less than 5°.

In another embodiment, an end section of the optical fiber may include a relatively long bare core section. In this embodiment, since the cladding does not have a tapered region, the amount of errant light coupled into the cladding may be reduced primarily by providing sufficient distance between the end of the optical fiber and the cladding. In particular, the cladding layer may be physically separated from the end of the optical fiber (i.e. and thus focal plane) by a section of optical fiber that does not have a cladding layer. For example, in one embodiment, the end of the optical fiber may be etched to provide the relatively long bare core section (i.e., having no cladding). In another embodiment, the separation may be provided by attaching (e.g., fusion splicing) a short length of pure silica fiber (i.e., which is known as a coreless fiber or coreless end cap) to the end of the optical fiber. The coreless optical fiber, which is not surrounded by a cladding layer, may have an out diameter (OD) that is approximately equal to or less than the core diameter of the optical fiber. For example, a piece of 200 µm OD coreless optical fiber may be spliced to a step index fiber with 200 µm core and 240 µm cladding. Light entering the coreless fiber may be guided by TIR, and couple into the core of the optical fiber. In general, the farther the cladding is from the end of the optical fiber (i.e., and thus focal plane), the less errant light may enter the cladding. In particular, if the coreless fiber is sufficiently long, almost all errant light from a focused beam missing the input facet of the coreless fiber may also miss the cladding of the step index fiber. For example, if the 200 µm coreless fiber is 2 mm long, and the focused beam is uniformly distributed within a numerical aperture of 0.15, the amount of errant light that may enter the 240 µm cladding is reduced by ~97%. In general, very little errant light may enter the cladding if the length of the bare core section (e.g., etched or coreless end cap) is more than ~75 times greater than the cladding thickness. Negligible errant light may enter the cladding if the length of the bare core section is more than ~100 times greater than the cladding thickness. Accordingly, if the cladding thickness is 20 µm, then the length of the bare core section may be least 1.5 mm, and preferably may be greater than ~2.0 mm.

The ferrule 710 may be an elongated body having a passageway 712, a chamfered leading edge 714 (e.g., an approximately 120° chamfer), and a flat end face 716. The chamfered leading edge 714 may prevent reflected light from returning to the source. The passageway 712 may have an internal diameter (ID) is at least slightly larger than the diameter of the optical fiber 700 such that the optical fiber fits therein. The passageway 712 may include a chamfer 717 at the back end of the ferrule such that the ID of the passageway is smaller at the front end than at the back end. For example, in one embodiment the section of the passageway at the front end has a close fitting ID, which is one to a few micrometers larger than the diameter of clad optical fiber, whereas the section of the passageway having the largest ID is at the output endface.

Advantageously, providing a larger ID on the output end may allow the optical fiber to be secured within the ferrule by applying an adhesive (e.g., epoxy) at the back end of the ferrule (e.g., in chamfer 717), whereas providing a providing a close fitting ID at the front end may prevent potential wicking of the adhesive (e.g., through capillary action) to the front of the ferrule, where the risk of burning by errant light is greatest. For example, as a result of the close-fitting ID on the input side, epoxy applied to the optical fiber in the chamfer region 717 is not expected to wick past the end of the chamfer 718. Preventing wicking of adhesive may also result in an epoxy-free tapered region, which may be advantageous because any epoxy on the tapered region may negatively affect both the TIR in the core and grazing angle reflection at the cladding. In addition, the close fitting ID of the ferrule also provides alignment stability of the fiber to within 1 µm, limiting coupling efficiency losses to about 1% for a 105 µm core fiber.

In general, the ferrule 710 may be prepared from a material having good machinability, smooth surface, and/or low absorption at the laser wavelength. For example, in one embodiment the ferrule material is ceramic. In another embodiment, the ferrule material may be a metal or a plastic. The ferrule may be press fit or bonded into the bulkhead 720 by means of epoxy or solder.

The ferrule 710 may have a highly reflective (HR) dielectric coating 715 at the front end of the ferrule through which the input end of the fiber protrudes. The HR coating 715 may reflect any errant light that misses the fiber, and may prevent absorption or transmission of the light by the ceramic ferrule. Advantageously, this may mitigate the problem of heating the ferrule and/or any adhesive holding the fiber, as well as any buffer coating that may be in contact with the ferrule, all of which may result in catastrophic damage from elevated temperature.

The bulkhead 720, which may support the ferrule 710, may be fabricated from a material having high thermal conductivity (e.g., a metal such as Cu or Al), which conducts heat created by optical absorption at the metal surface away from the surface. The bulkhead 720 may have a recess 723 at the front end, which physically protects the end of the optical fiber 701 that protrudes from the end of the ferrule 710.

In general, the section of the optical fiber that includes the tapered region and/or the bare core section may be disposed within the recess 723. Advantageously, reasonable stability has been exhibited even when the optical fiber extends past the ferrule 710 by 5 mm. This relatively high stability, which may be at least partially achieved via the narrow aperture hole 712, advantageously allows the bare core section (e.g., etched or coreless end cap) to be more than ~75 times greater or more than ~100 times greater than the cladding thickness. For example, this stability allows 2-3 mm coreless end caps to be used, thus reducing the amount of light that can enter the cladding by about 97%. In fact, it has been found that separating the cladding from the end of the optical fiber (i.e., the focal plane) by distances that are over 1.5 mm, and particularly over 2.0 mm, reduces almost all errant light from entering the cladding.

Figure 8:
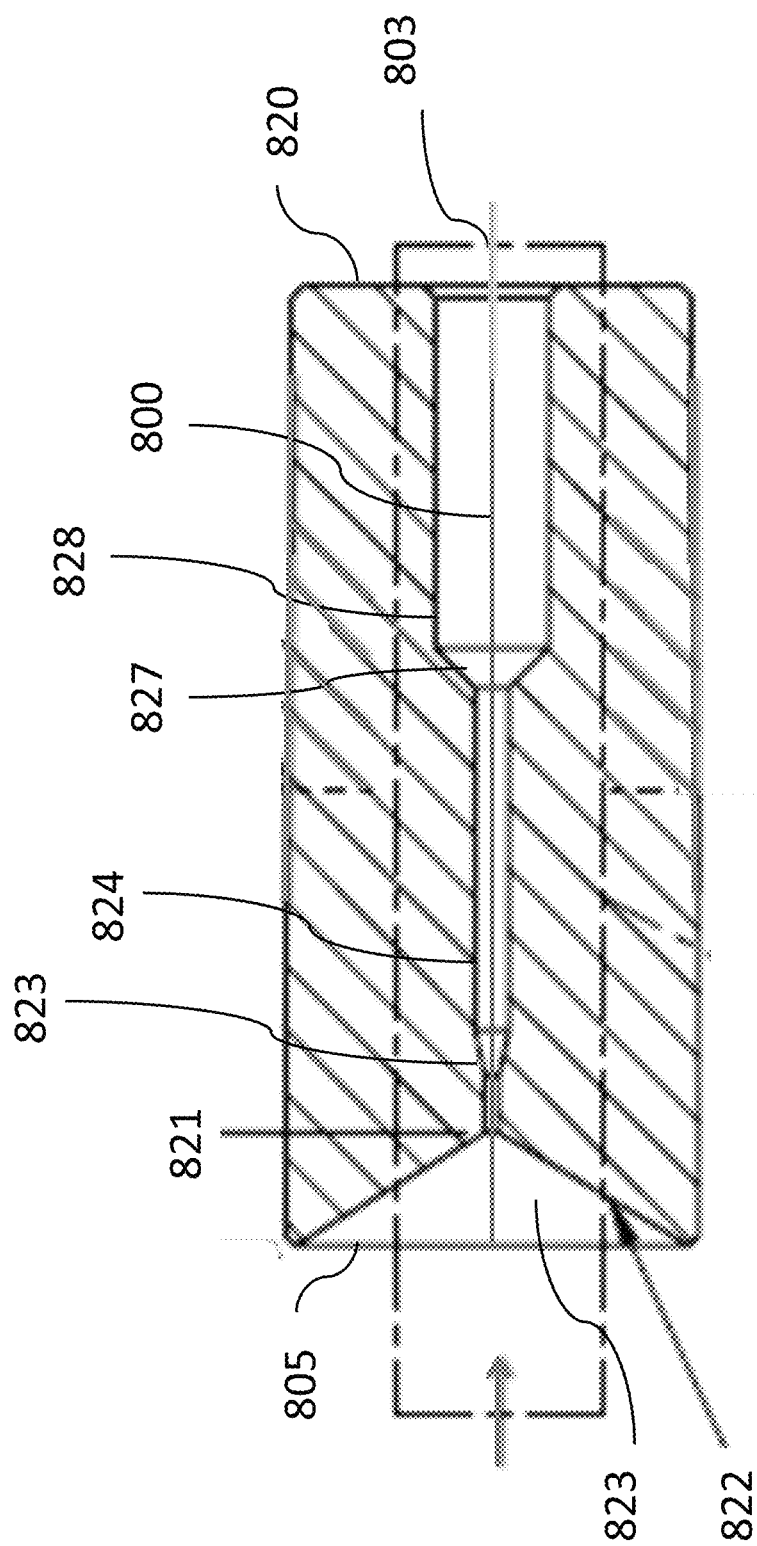
FIG. 8 is a schematic diagram of an optical fiber assembly having a monolithic mount, according to an exemplary embodiment.

Referring to FIG. 8, there is shown an embodiment of an optical fiber assembly, which may include the optical fiber 800 and a bulkhead 820, which supports the optical fiber 800 directly.

The optical fiber 800 may be an optical fiber having a core and a cladding, which may be fabricated from any waveguide material such as glass or polymer. In general, the index of refraction of the cladding material may be lower than the index of refraction of the core material so that light may be kept in the core by TIR. The optical fiber includes a buffer layer 803, which stripped at the end of optical fiber. For example, in one embodiment, the optical fiber may be a multi-mode optical fiber having a silica core, a fluorosilicate cladding, and an acrylate buffer layer. In another embodiment, the optical fiber may be a single mode optical fiber having a silica core, a fluorosilicate cladding, and an acrylate buffer layer.

In one embodiment, the cladding of the optical fiber 800 may include a transition region wherein a thickness of the cladding is tapered (e.g., increasing in thickness in the direction of incident light propagation). In general, the taper angle may be relatively small. For example, in one embodiment the taper angle is less than 5° relative to the fiber axis (i.e., the angle of the transition is greater than 85° relative to the fiber input endface such that the transition is nearly parallel to the fiber axis). In another embodiment the taper angle is less than 3° relative to the fiber axis (i.e., the angle of the transition is greater than 87° relative to the fiber input endface such that the transition is nearly parallel to the fiber axis). Advantageously, designing the optical fiber 800 such that the taper angle is less than 3° may result in very light entering the cladding layer. In general, the transition region (i.e., the region wherein there is a cladding thickness gradient) may be relatively long. For example, in one embodiment the length of the transition region may be more than 10 times greater than the cladding thickness. In one embodiment, the transition region may begin at the fiber input endface. In another embodiment, the transition region may begin at a location separated from the input endface by a section of exposed optical fiber (i.e., wherein the cladding has been entirely removed) or by a section of optical fiber having a relatively thin cladding layer (e.g., wherein the cladding has been uniformly reduced by etching). In one embodiment the section of exposed optical fiber may be more than ~75 times greater than the cladding thickness. In one embodiment, the transition region may have a relatively uniform gradient (i.e., the taper angle is constant throughout the transition region). In other embodiments, the transition region may include some small variation in taper angle. For example, in some embodiments, the fabrication process may introduce small variations in taper angle throughout the transition region. In these embodiments, the average taper angle within the transition region may be less than 5°.

In another embodiment, an end section of the optical fiber may include a relatively long bare core section. In this embodiment, since the cladding does not have a tapered region, the amount of errant light coupled into the cladding may be reduced primarily by providing sufficient distance between the end of the optical fiber and the cladding. In particular, the cladding layer may be physically separated from the end of the optical fiber (i.e. and thus focal plane) by a section of optical fiber that does not have a cladding layer. For example, in one embodiment, the end of the optical fiber may be etched to provide the relatively long bare core section (i.e., having no cladding). In another embodiment, the separation may be provided by attaching (e.g., fusion splicing) a short length of pure silica fiber (i.e., which is known as a coreless fiber or coreless end cap) to the end of the optical fiber. The coreless optical fiber, which is not surrounded by a cladding layer, may have an out diameter (OD) that is approximately equal to or less than the core diameter of the optical fiber. For example, a piece of 200 μm OD coreless optical fiber may be spliced to a step index fiber with 200 μm core and 240 μm cladding. Light entering the coreless fiber may be guided by TIR, and couple into the core of the optical fiber. In general, the farther the cladding is from the end of the optical fiber (i.e., and thus focal plane), the less errant light may enter the cladding. In particular, if the coreless fiber is sufficiently long, almost all errant light from a focused beam missing the input facet of the coreless fiber may also miss the cladding of the step index fiber. For example, if the 200 μm coreless fiber is 2 mm long, and the focused beam is uniformly distributed within a numerical aperture of 0.15, the amount of errant light that can enter the 240 μm cladding is reduced by ~97%. In general, very little errant light may enter the cladding if the length of the bare core section (e.g., etched or coreless end cap) is more than ~75 times greater than the cladding thickness. Negligible errant light may enter the cladding if the length of the bare core section is more than ~100 times greater than the cladding thickness. Accordingly, if the cladding thickness is 20 μm, then the length of the bare core section may be least 1.50 mm, and preferably may be greater than ~2.0 mm.

The bulkhead 820, which may support the fiber 800, may have a recessed surface 822 at the front end. The recessed surface 822, which may be outwardly tapered at an obtuse angle (e.g., a 120° full angle), may reflect any errant light that strikes the front end away from the light source, thus avoiding potential damage and/or instability of the light source. In one embodiment, the bulkhead 820 may be fabricated from a material having high thermal conductivity (e.g., Cu or Al), which conducts heat created by optical absorption at the surface away from the surface. In another embodiment, the bulkhead 820 may be fabricated from a different material and may include a separate mechanism to address at least some of the errant high power light that would otherwise strike the end of the bulkhead. For example, while metal bulkheads are readily affixed to the desired support using well-known methods, it may be also possible for the bulkhead 820 to be formed from a different material.

The bulkhead 820 may include a passageway that extends from a center of the recess 823 to the output end of the bulkhead. The passageway may include a first region 821 having a relatively small ID 821, a second region 824 having a larger ID, and a third region 828 having a ID that is larger than the ID of the second region 824. A first chamfer 823 may separate the first and second regions, whereas a second chamfer 827 may separate the second and third regions. The ID of the first region 821 may be a few microns larger than the diameter of the section of optical fiber 800 therein.

In general, the section of the optical fiber that includes the tapered region and/or the bare core section may be disposed within the recess 823. Advantageously, reasonable stability has been exhibited even when the end of the optical fiber extends past the end of the first region 821 by 5 mm. This relatively high stability, which may be at least partially achieved via the narrow aperture of the first region 821, advantageously allows the optical fiber to include a bare core section (e.g., etched or coreless end cap) and/or tapered section that is disposed entirely within the recess 823, even if the distance between the end of the fiber and the cladding is more than ~100 times greater than the cladding thickness. For example, in one embodiment, the end of the optical fiber 800 may protrude from the passageway 821 by about 1-3 mm and may be flush with the end of the bulkhead (e.g., at the focal plane 805). Allowing the end of the optical fiber 800 to extend into the recess 823 advantageously provides some distance between the bulkhead 820 and the fiber tip, while protecting the tip of the optical fiber.

In one embodiment, the optical fiber 800 may be secured within the passageway (e.g., attached to the bulkhead 820) with an adhesive such as epoxy. In this embodiment, the buffer coating 803 on the optical fiber 800 may also extend into the third region 828. In other embodiments, the buffer coating 803 may be stripped away from the optical fiber such that it is not surround by the bulkhead.

Advantageously, the narrow aperture provided by the first region 821 may prevent errant light from hitting the adhesive (e.g., epoxy), which may be applied to the section of optical fiber in the third region 828. Further advantageously, the combination of providing a narrow opening in the bulkhead (i.e., the first region 821) and the optical fiber having a tapered region and/or bare core section provides a particularly effective solution to the problems of errant light being launching directly into the cladding.

In the embodiments described with reference to FIGS. 6, 7, and 8, the optical fiber assemblies may use a bulkhead or feedthrough-type mount design. In other embodiments, the mounting components may be internal to the housing (e.g., of a high power fiber coupled laser).

Referring to FIGS. 9a-9c, there is shown an embodiment of an optical fiber assembly, which may include the optical fiber 900, a cladding mode stripper 970, and a mount 980, all of which may be internal to the housing of a high power fiber coupled laser.

The optical fiber 900 may be an optical fiber having a core 901, a cladding 902 surrounding the core, and a buffer coating 903 surrounding the cladding. The core 901 and cladding 902 may be fabricated from any waveguide material such as glass or polymer, whereas the buffer coating may be fabricated from a material that protects the clad/core. In general, the index of refraction of the cladding material may be lower than the index of refraction of the core material so that light may be kept in the core by TIR. For example, in one embodiment, the optical fiber may be a multi-mode optical fiber having a silica core, a fluorosilicate cladding, and an acrylate buffer layer. In another embodiment, the optical fiber may be a single mode optical fiber having a silica core, a fluorosilicate cladding, and an acrylate buffer layer.

In one embodiment, the cladding 902 of the optical fiber may include a transition region 902a wherein a thickness of the cladding is varied (e.g., tapered) such that it is thinner and/or negligible on the side closest to the focal plane 905 and increases in the direction of incident light propagation. In general, the taper angle may be relatively small. For example, in one embodiment the taper angle is less than 5° relative to the fiber axis (i.e., the angle of the transition is greater than 85° relative to the fiber input endface such that the transition is nearly parallel to the fiber axis). In another embodiment the taper angle is less than 3° relative to the fiber axis (i.e., the angle of the transition is greater than 87° relative to the fiber input endface such that the transition is nearly parallel to the fiber axis). Advantageously, etching the optical fiber 900 such that the taper angle is less than 3° may result in very light entering the cladding layer. In general, the transition region (i.e., the region wherein there is a cladding thickness gradient) may be relatively long. For example, in one embodiment the length of the transition region may be more than 10 times greater than the cladding thickness. In this embodiment, the transition region may begin at a location separated from the input endface by a section of exposed optical fiber 901a (i.e., wherein the cladding has been entirely removed). In other embodiments, the transition region may begin at a location separated from the input endface by a section of optical fiber having a relatively thin cladding layer (e.g., wherein the cladding has been uniformly reduced by etching). In one embodiment the section of exposed optical fiber may be more than ~75 times greater than the cladding thickness. In one embodiment, the transition region may have a relatively uniform gradient (i.e., the taper angle is constant throughout the transition region). In other embodiments, the transition region may include some small variation in taper angle. For example, in some embodiments, the fabrication process may introduce small variations in taper angle throughout the transition region. In these embodiments, the average taper angle within the transition region may be less than 5°.

In another embodiment, the end section of the optical fiber may include the relatively long bare core section 901a. In this embodiment, since the cladding does not have a tapered region, the amount of errant light coupled into the cladding may be reduced primarily by providing sufficient distance between the end of the optical fiber and the cladding. In particular, the cladding layer may be physically separated from the end of the optical fiber (i.e. and thus focal plane) by a section of optical fiber that does not have a cladding layer. For example, in one embodiment, the end of the optical fiber may be etched to provide the relatively long bare core section (i.e., having no cladding). In another embodiment, the separation may be provided by attaching (e.g., fusion splicing) a short length of pure silica fiber (i.e., which is known as a coreless fiber or coreless end cap) to the end of the optical fiber. The coreless optical fiber, which is not surrounded by a cladding layer, may have an out diameter (OD) that is approximately equal to or less than the core diameter of the optical fiber. For example, a piece of 200 μm OD coreless optical fiber may be spliced to a step index fiber with 200 μm core and 240 μm cladding. Light entering the coreless fiber may be guided by TIR, and couple into the core of the optical fiber. In general, the farther the cladding is from the end of the optical fiber (i.e., and thus focal plane), the less errant light may enter the cladding. In particular, if the coreless fiber is sufficiently long, almost all errant light from a focused beam missing the input facet of the coreless fiber may also miss the cladding of the step index fiber. For example, if the 200 μm coreless fiber is 2 mm long, and the focused beam is uniformly distributed within a numerical aperture of 0.15, the amount of errant light that can enter the 240 μm cladding is reduced by ~97%. In general, very little errant light may enter the cladding if the length of the bare core section (e.g., etched or coreless end cap) is more than ~75 times greater than the cladding thickness. Negligible errant light may enter the cladding if the length of the bare core section is more than ~100 times greater than the cladding thickness. Accordingly, if the cladding thickness is 20 μm, then the length of the bare core section may be least 1.5 mm, and preferably may be greater than ~2.0 mm.

The mount 980 may be a two-part assembly including a clamp 980a and a base 980b. Referring to FIG. 9a, which is a front view of the fiber assembly, the clamp 980a and the base 980b have complementing v-grooves for mounting the optical fiber. Accordingly, most of the errant light that misses the optical fiber may be blocked and heat sunk by the mount (e.g., which may be metal having high thermal conductivity). Referring to FIG. 9b, which is a top view of the fiber assembly, the clamp 980a and the base 980b are fixedly secured with one or more fasteners 982.

The cladding mode stripper 970 may remove any optical energy from the cladding of the optical fiber 900 (e.g., by index-matching). In one embodiment, the cladding mode stripper 970 may include a ferrule into which the optical fiber is fixed with an index-matching adhesive (e.g., epoxy). For example, in one embodiment the cladding mode stripper may include a ceramic ferrule (i.e., zirconia) affixed to the fiber with epoxy. In this embodiment, the light stripped from the cladding is scattered by the ceramic and absorbed inside the metal mount 980. In another embodiment, the cladding mode stripper may include a quartz ferrule which is used to strip the cladding light and guide the light to the end of the quartz ferrule. In yet another embodiment, the cladding mode stripper 970 may include silicone filled reservoir. For example, in one embodiment, the cladding mode stripper may be provided by filling the v-groove in the base 980b with high index silicone. In each case, a second v-groove (not shown) is optionally provided to remove and/or block the light before it reaches the adhesive (e.g., epoxy) 940 used to mount the fiber or the fiber acrylate.

Figure 10:
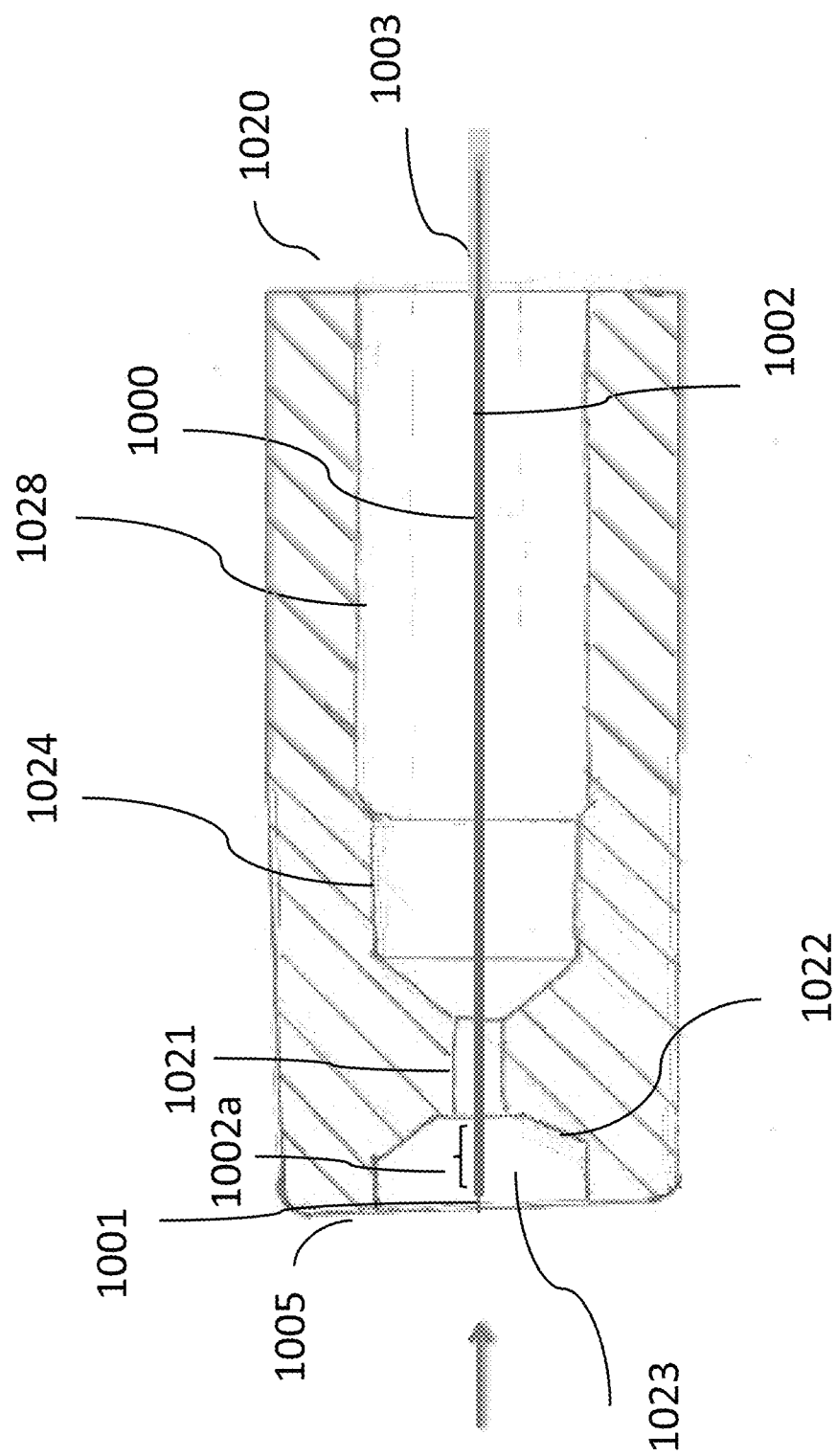
FIG. 10 is a schematic diagram of the optical fiber assembly having a metal ferrule, according to an exemplary embodiment.

Referring to FIG. 10, there is shown an embodiment of an optical fiber assembly, which may include an optical fiber 1000 and a metal ferrule 1080.

The optical fiber 1000 may be an optical fiber having a core 1001, a cladding 1002, and a buffer coating 1003. The core 1001 and cladding 1002 may be fabricated from any waveguide material such as glass or polymer, whereas the buffer coating may be fabricated from a material that protects the clad/core. In general, the index of refraction of the cladding material may be lower than the index of refraction of the core material so that light may be kept in the core by total internal reflection (TIR). For example, in one embodiment, the optical fiber may be a multi-mode optical fiber having a silica core, a fluorosilicate cladding, and an acrylate buffer layer. In another embodiment, the optical fiber may be a single mode optical fiber having a silica core, a fluorosilicate cladding, and an acrylate buffer layer.

In one embodiment, the cladding 1002 of the optical fiber may include a transition region wherein a thickness of the cladding is varied (e.g., tapered) such that it is thinner and/or negligible on the side closest to the focal plane 1005 and increases in the direction of incident light propagation. In general, the taper angle may be relatively small. For example, in one embodiment the taper angle is less than 5° relative to the fiber axis (i.e., the angle of the transition is greater than 85° relative to the fiber input endface such that the transition is nearly parallel to the fiber axis). In another embodiment the taper angle is less than 3° relative to the fiber axis (i.e., the angle of the transition is greater than 87° relative to the fiber input endface such that the transition is nearly parallel to the fiber axis). Advantageously, etching the optical fiber 1000 such that the taper angle is less than 3° may result in very light entering the cladding layer. In general, the transition region (i.e., the region wherein there is a cladding thickness gradient) may be relatively long. For example, in one embodiment the length of the transition region may be more than 10 times greater than the cladding thickness. In this embodiment, the transition region is spaced apart from the end of the optical fiber by a section of exposed optical fiber (i.e., wherein the cladding has been entirely removed). For example, in one embodiment the section of exposed optical fiber may be more than ~75 times greater than the cladding thickness. In other embodiments, the transition region may begin at a location separated from the input endface by a section of optical fiber having a relatively thin cladding layer (e.g., wherein the cladding has been uniformly reduced by etching). In one embodiment, the transition region may have a relatively uniform gradient (i.e., the taper angle is constant throughout the transition region). In other embodiments, the transition region may include some small variation in taper angle. For example, in some embodiments, the fabrication process may introduce small variations in taper angle throughout the transition region. In these embodiments, the average taper angle within the transition region may be less than 5°.

In another embodiment, an end section of the optical fiber may include a relatively long bare core section. In this embodiment, since the cladding does not have a tapered region, the amount of errant light coupled into the cladding may be reduced primarily by providing sufficient distance between the end of the optical fiber and the cladding. In particular, the cladding layer may be physically separated from the end of the optical fiber (i.e. and thus focal plane) by a section of optical fiber that does not have a cladding layer. For example, in one embodiment, the end of the optical fiber may be etched to provide the relatively long bare core section (i.e., having no cladding). In another embodiment, the separation may be provided by attaching (e.g., fusion splicing) a short length of pure silica fiber (i.e., which is known as a coreless fiber or coreless end cap) to the end of the optical fiber. The coreless optical fiber, which is not surrounded by a cladding layer, may have an out diameter (OD) that may be approximately equal to or less than the core diameter of the optical fiber. For example, a piece of 200 μm OD coreless optical fiber may be spliced to a step index fiber with 200 μm core and 240 μm cladding. Light entering the coreless fiber may be guided by TIR, and couple into the core of the optical fiber. In general, the farther the cladding is from the end of the optical fiber (i.e., and thus focal plane), the less errant light may enter the cladding. In particular, if the coreless fiber is sufficiently long, almost all errant light from a focused beam missing the input facet of the coreless fiber may also miss the cladding of the step index fiber. For example, if the 200 μm coreless fiber is 2 mm long, and the focused beam is uniformly distributed within a numerical aperture of 0.15, the amount of errant light that can enter the 240 μm cladding is reduced by ~97%. In general, very little errant light may enter the cladding if the length of the bare core section (e.g., etched or coreless end cap) is more than ~75 times greater than the cladding thickness. Negligible errant light may enter the cladding if the length of the bare core section is more than ~100 times greater than the cladding thickness. Accordingly, if the cladding thickness is 20 μm, then the length of the bare core section may be least 1.5 mm, and preferably may be greater than ~2.0 mm.

The metal ferrule 1020, which may support the fiber 1000, may have a recessed surface 1022 at the front end. The recessed surface 1022, which may be outwardly tapered at an obtuse angle (e.g., a 120° full angle), may reflect any errant light that strikes the front end away from the light source, thus avoiding potential damage and/or instability of the light source. The ferrule 1020 may be fabricated from a metal having high thermal conductivity (e.g., Cu or Al), which conducts heat created by optical absorption at the surface away from the surface. For example, in one embodiment the metal ferrule 1020 may be a copper (Cu) or aluminum (Al) ferrule with gold (Au) plating.

The metal ferrule 1020 may be attached to the optical fiber 1000 with solder (e.g., a solder such as AuSn, BiSn, or AgSn). In particular, the metal ferrule 1020 may have a passageway into which the optical fiber is fed, including a first region 1021 having a relatively small ID, a second region 1024 having a larger ID, and a third region 1028 having a ID that is similar to but may be larger than the ID of the second region 1024. A first chamfer may separate the first and second regions, whereas a second chamfer may separate the second and third regions. The ID of the first region 1021 may be a few microns larger than the diameter of the clad optical fiber 1000. The first 1021 and second 1024 regions have wettable surfaces (i.e., on which a solder bond may be formed). The recess 1023 and third region 1028 have non-wettable surfaces. The solder may be minimally in contact with the fiber, but may provide adequate mechanical stability to maintain alignment. Epoxy may be applied to the fiber 1000 to bond the back end of the ferrule (e.g., third region) to the fiber, thus providing pull strength. The ferrule may be compressive on the solder after reflow aided by thermal mismatch of metal to fiber. In order to aid solder flow into the ferrule, a port near the front end may be provided to allow trapped gas to escape.

In one embodiment, the end of the optical fiber 1000 may protrude from the passageway in the first region 1021 and may be flush with the end of the ferrule (e.g., at the focal plane 1005). Allowing the tip of the optical fiber 1000 to extend into the recess 1023 advantageously provides some distance between the ferrule 1020 and the fiber tip, while protecting the tip of the optical fiber. The narrow aperture 1021 may block any grossly misaligned light, whereas light making it through the narrow opening and impinging on the solder may be either reflected or absorbed by the solder. Since the solder also has a high thermal conductivity, the solder may transfer the heat to the metal ferrule and/or module housing, thus preventing reflow of the solder.

In one embodiment, the end of the optical fiber may be positioned such that the transition region and/or bare core region (e.g., shown as 1002*a*) is disposed within the recess 1023, while the non-etched fiber (e.g., the core and cladding having maximum cladding thickness) is disposed within the first region of the passageway 1021. Positioning the optical fiber such that the non-etched fiber begins at the opening aperture of the first region 1021 advantageously allows the clad optical fiber to be covered with solder, thus preventing light from coupling into cladding layer of the fiber.

In the above-described embodiment wherein the solder may be minimally in contact with the fiber, the optical fiber may not make good thermal contact with the ferrule. In other embodiments, the fiber may be provided with a metallized coating before being thread into the ferrule and attached with epoxy, thus improving thermal contact and solder coverage.

In each of the above-described embodiments wherein the optical fiber includes a bare core section, the end of the optical fiber optionally protrudes from the end of the narrow aperture support structure (e.g., ferrule or bulkhead) by about 1-3 mm and may be flush with the end of the support structure (e.g., at the focal plane). For example, in one embodiment a relatively long section of coreless end cap may be attached to the end of the optical fiber and subsequently cleaved and polished to be flush with the end of the support structure. In another embodiment, a relatively short (e.g., 1-2 mm) and previously polished coreless end cap may be attached to the optical fiber, with the end of the coreless end cap being flushed with the end of the support structure or recessed from the end of the support structure. In each case, attaching a coreless end cap to the optical fiber may provide an optical fiber assembly that is much easier to fabricate in bulk than one in which the cladding of optical fiber is etched to provide a bare core section and/or tapered region. Furthermore, providing a mount wherein the coreless end cap extends out past the smallest diameter hole of the mount, yet surrounds the cladding, may allow the cladding to be protected by the small aperture thus further preventing errant light from entering the cladding.

Although optical fibers having a tapered cladding layer may be more time consuming to fabricate, the fact that a large number of optical fiber assemblies use multi-mode optical fibers, the fact that multi-mode optical fibers may be readily etched using wet-etching techniques (e.g., using the inherent etch stop), and the fact that the tapered cladding layer having a relatively long transition length has been found to significantly decrease the amount of light that enters the cladding, may compensate for the longer fabrication time. When the tapered cladding region is combined with the relatively long bare core fiber region, complete blocking of errant light may be expected.

Of course, the above embodiments have been provided as examples only. Numerous other embodiments can be envisaged without departing from the spirit and scope of the invention. For example, in the fiber optic assembly discussed with reference to FIGS. 9*a*-9*c*, the complementing V grooves could be replaced by a single groove on the base. In fact, it will be appreciated by those of ordinary skill in the art that various modifications, alternate configurations, and/or equivalents will be employed without departing from the spirit and scope of the invention. Accordingly, the scope of the invention is therefore intended to be limited solely by the scope of the appended claims.

What is claimed is:

1. An optical fiber assembly comprising:
an optical fiber including a core and a cladding, the optical fiber having an end face for receiving incident light, and the core and cladding for guiding the incident light along the optical fiber in a light propagation direction; and
a mount for supporting the optical fiber, the mount including a passageway extending therethrough for receiving the optical fiber, and the optical fiber being disposed such that a portion of the optical fiber extends outward from an opening of the passageway to a focal plane of the incident light, wherein
the cladding is tapered to create a tapered cladding region,
a thickness of the cladding in the tapered cladding region increases in the light propagation direction, and
a first amount of light, captured at a first portion of the tapered cladding region, and a second amount of light, captured as a second portion of the tapered cladding region, are removed using index matching.

2. The optical fiber assembly according to claim 1, wherein an end of the optical fiber comprises a bare core section.

3. The optical fiber assembly according to claim 2, wherein a length of the bare core section is at least 100 times greater than a maximum cladding thickness of the optical fiber.

4. The optical fiber assembly according to claim 2, wherein the bare core section comprises a coreless end cap.

5. The optical fiber assembly according to claim 4, wherein the coreless end cap is at least 1.5 mm long.

6. The optical fiber assembly according to claim 4, wherein the coreless end cap is at least 2 mm long.

7. The optical fiber assembly according to claim 1, wherein the optical fiber extends outward from the opening of the passageway by about 2 mm.

8. The optical fiber assembly according to claim 1, wherein the mount comprises a recess having a recessed surface, and wherein an end of the optical fiber is disposed entirely within the recess.

9. The optical fiber assembly according to claim 8, wherein the recessed surface comprises an outward taper, the outward taper being at an obtuse angle relative to an axis of the optical fiber.

10. The optical fiber assembly according to claim 8, wherein the mount comprises a ferrule and a bulkhead for supporting the ferrule, the bulkhead including the recess and the passageway.

11. The optical fiber assembly according to claim 8, wherein the mount comprises a ferrule and a bulkhead for supporting the ferrule, the bulkhead including the recess, and the ferrule including the passageway.

12. The optical fiber assembly according to claim 11, wherein the ferrule has a reflective surface at a frontend thereof for reflecting the incident light.

13. The optical fiber assembly according to claim 8, wherein the mount comprises a bulkhead, the bulkhead including the recess and the passageway.

14. The optical fiber assembly according to claim 1, wherein the mount comprises at least one of a ferrule or a bulkhead, and wherein the optical fiber is fixedly coupled to the mount with epoxy disposed at a back end of the mount.

15. The optical fiber assembly according to claim 14, wherein the passageway comprises a first bore region at a front end of the mount and a second bore region at the back end of the mount, the epoxy being disposed in the second bore region, and a diameter of the first bore region being smaller than a diameter of the second bore region such that light incident on the end face of the optical fiber does not substantially irradiate the epoxy.

16. The optical fiber assembly according to claim 15, wherein the diameter of the first bore region is larger than a diameter of a bare core section of optical fiber therein.

17. The optical fiber assembly according to claim 1, wherein the mount comprises a metal ferrule, and wherein the optical fiber is soldered to the metal ferrule.

18. The optical fiber assembly according to claim 4, wherein the mount comprises a recess, and wherein the coreless end cap is disposed entirely within the recess.

19. The optical fiber assembly according to claim 1, wherein the mount comprises a base and a clamp, at least one of the base or the clamp having a groove for accommodating the optical fiber, and wherein the optical fiber assembly comprises a cladding mode stripper.

20. The optical fiber assembly according to claim 1, wherein an end of the optical fiber comprises the tapered cladding region, and wherein the tapered cladding region has a length that is about 10 times greater than a maximum cladding thickness.

21. The optical fiber assembly according to claim 1, wherein the optical fiber is a multi-mode optical fiber, the multi-mode optical fiber comprising an etched section wherein the cladding has been at least partially removed, the etched section including the tapered cladding region.

22. The optical fiber assembly according to claim 1, wherein a thickness of the cladding in the tapered cladding region ranges between zero and a maximum cladding thickness.

23. The optical fiber assembly according to claim 1, wherein a thickness of the cladding at the opening of the passageway is a maximum cladding thickness, and wherein a thickness of the cladding at the focal plane is substantially equal to zero.

24. An optical fiber assembly comprising:
an optical fiber including a core and a cladding, the optical fiber having an end face for receiving incident light, and the core and cladding for guiding the incident light along the optical fiber in a light propagation direction; and,
a mount for supporting the optical fiber, the mount including a passageway extending therethrough for receiving the optical fiber, and the optical fiber being disposed such that a portion of the optical fiber extends outward from an opening of the passageway to a focal plane of the incident light, wherein
an end of the optical fiber comprises a bare core section having a length that is greater than a maximum cladding thickness of the optical fiber, and
a first amount of light, captured at a first portion of a tapered cladding region of the cladding, and a second amount of light, captured as a second portion of the tapered cladding region, are removed.

25. An optical fiber assembly comprising:
an optical fiber including a core and a cladding, the optical fiber having an end face for receiving incident light, and the core and cladding for guiding the incident light along the optical fiber in a light propagation direction; and,
a mount for supporting the optical fiber, the mount including a passageway extending therethrough for receiving the optical fiber, and the optical fiber being disposed such that a portion of the optical fiber extends outward from an opening of the passageway to a focal plane of the incident light, wherein
an end of the optical fiber comprises a tapered cladding region,
a thickness of the cladding in the tapered cladding region increases in the light propagation direction, and
a first amount of light, captured at a first portion of the tapered cladding region, and a second amount of light, captured as a second portion of the tapered cladding region, are removed using index matching.

26. The optical fiber assembly according to claim 25, wherein the tapered cladding region has a length that is about 10 times greater than a maximum thickness of the cladding.

* * * * *